United States Patent [19]

Mino

[11] Patent Number: 5,011,287

[45] Date of Patent: Apr. 30, 1991

[54] INTERFEROMETER OBJECT POSITION MEASURING SYSTEM AND DEVICE

[75] Inventor: Masayuki Mino, Toyokawa, Japan

[73] Assignee: Minolta Camera Kabushiki Kaisha, Osaka, Japan

[21] Appl. No.: 450,504

[22] Filed: Dec. 7, 1989

Related U.S. Application Data

[63] Continuation of Ser. No. 129,730, Dec. 7, 1987, abandoned.

[30] Foreign Application Priority Data

Dec. 8, 1986 [JP] Japan .................................. 61-292110

[51] Int. Cl.$^5$ ................................................ G01B 9/02
[52] U.S. Cl. .......................................... 356/356; 356/354
[58] Field of Search .......................... 356/354, 355, 356

[56] References Cited

U.S. PATENT DOCUMENTS 3,090,279 5/1963 Chisholm ............................ 356/354

OTHER PUBLICATIONS

Miyamoto, Non-Contact Type Optical Fine Configuration Measuring System, Mechatronics Design News, vol. 10, No. 1, Jan. 1985 (with translation).

Primary Examiner—Samuel Turner
Attorney, Agent, or Firm—Price, Gess & Ubell

[57] ABSTRACT

An object position measuring system for use in measuring, without contact with an object displacement amounts of an object, conditions of an object surface and the like; the system having a light beam source, a diffraction grating for diffracting light beam emitted from the light beam source, a converging optical arrangement for orienting and converging a pair of positive and negative diffracted beam components of the beam diffracted by the diffraction grating onto the object and for orienting and converging the diffracted beam reflected by the object onto the diffraction grating, and a screen for displaying interference fringes of the reflected diffracted beam components diffracted by the diffraction grating. According to this system, the position of the object is determined by diffracting through the diffracting grating beam emitted from the source, projecting the pair of diffracted beam components onto the object, causing the pair of diffracted beam components reflected by the object to interfere with each other and then by evaluating the resultant interference fringes.

26 Claims, 10 Drawing Sheets

INTERFEROMETER OBJECT POSITION MEASURING SYSTEM AND DEVICE

This is a continuation of application Ser. No. 129,730, filed Dec. 7, 1987 now abandoned.

BACKGROUND OF THE INVENTION

1. Field of the Invention

The present invention relates to an object position measuring system and device for use in measuring without contact, fine displacement amounts of an object, conditions of an object surface, and so on.

2. Description of the Prior Art

With the growth of factory automation in recent years, and more specially in the manufacturing processes of various products, there has been an increasing demand for measurement of displacement amounts and surface conditions of the products in order to control the positions of the products or to check surface finish conditions of the same. Especially, in the case of such products as lenses or mirrors which are vulnerable to clouds because of vapor film formed on surfaces thereof or as a semiconductor which is vulnerable even to small external forces, it is essential that the displacement amount or the surface condition measurement be carried out in a non-contact method.

Most of object displacement amount or surface condition measuring systems of the above non-contact type utilize a light beam. It is to be noted here that the measurement of object displacement amount or surface condition will be generically referred to as object position measurement in the following description of the present invention.

One of the most typical conventional position measuring systems carries out the object position measurement by the focusing of a microscope. This system utilizes in combination, a microscope and a focus detecting mechanism for use e.g. in the field of the digital audio disk. In operation, the object position measurement is carried out by detecting focusing or focusing error on an enlarged surface of an object to be inspected.

Another conventional position measuring system employs a light beam reflecting type sensor using an optical fiber cable. In operation, a light beam is applied onto an inspection object through an optical fiber having a predetermined projection angle at an end thereof and the beam reflected from the object enters the optical fiber having the predetermined light receiving angle. Then, the object displacement amount is obtained by measuring the amount of light received by the optical fiber.

That is to say, the beam projecting fiber and the beam receiving fiber have the predetermined projecting angle, and the predetermined receiving angle respectively. Thus, if these fibers are displaced with a predetermined distance, the amount of light received by the receiving fiber varies in accordance with a variation in the displacement amount of the object. Therefore, it is possible to obtain the displacement amount by calculating the variation in the amount of the received light.

However, with the above conventional systems, there are problems. These problems will be described next.

In the case of the former system utilizing focusing of a microscope, it is necessary to increase a magnification of an object lens in order to achieve a high precision measurement. However, with the increased magnification of the object lens, the distance between the object and the lens becomes very short. This means that the operative distance (range) of the measuring device, i.e. the distance which permits the measuring device or the object to move freely without coming into contact with the other, becomes short. Therefore, it is difficult to measure an object having surface unevenness.

The second system mentioned above measures variation in the amount of a light beam reflected from the object. It is easy to measure an object displacement amount with high sensitivity in a region adjacent the open end of the fiber since the variation in the received light fluctuates very conspicuously about the peak of received light amount in this region. However, if the object is disposed distantly from the peak, the amount does not vary so conspicuously. For this reason, the operative range of the device need be sacrificed for the sake of high measuring precision, and it is difficult for this system to measure an object having a large displacement amount variation or having considerable surface unevenness.

SUMMARY OF THE INVENTION

Therefore, it is the object of the present invention to solve the above-described problems of the prior art and to provide an improved object position measuring system of non-contact type capable of accurately measuring displacement amount or surface condition or the like of an object while maintaining a sufficient operative distance of a measuring device.

In order to accomplish the above object, according to the present invention, there is provided an object position measuring method which utilizes the steps of generating parallel beams of light, diffracting the light beams to produce a pair of positive and negative diffracted beams, concentrating each of the diffracted beams onto the object so that each of the diffracted beams is reflected by the object, re-diffracting each of the diffracted beams reflected by the object to interfere with each other thereby to provide interference fringes if the object is positioned out of a point on which each of the diffracted beams is concentrated, and evaluating the interference fringes to determine the position of the object.

Further according to the present invention, there is provided an object position measuring device comprising, means for generating a light beam source, a diffraction grating means for diffracting light beams emitted from the light beams source, a converging optical means for orienting and converging a pair of positive and negative diffracted beam components of the beam diffracted by the diffraction grating means to the object and for orienting and converging the beam reflected by the object to the diffraction grating means, and an intereference fringes evaluating means for the evaluating interference fringes of the reflected diffracted light beams diffracted by the diffraction grating means.

BRIEF DESCRIPTION OF THE DRAWINGS

These and other objects and advantages of the present invention may be readily ascertained by referring to the following description and appended drawings in which.

DESCRIPTION OF THE PREFERRED EMBODIMENTS

Preferred embodiments of the present invention will be described hereinafter with reference to the accompanying drawings.

Figure 1:
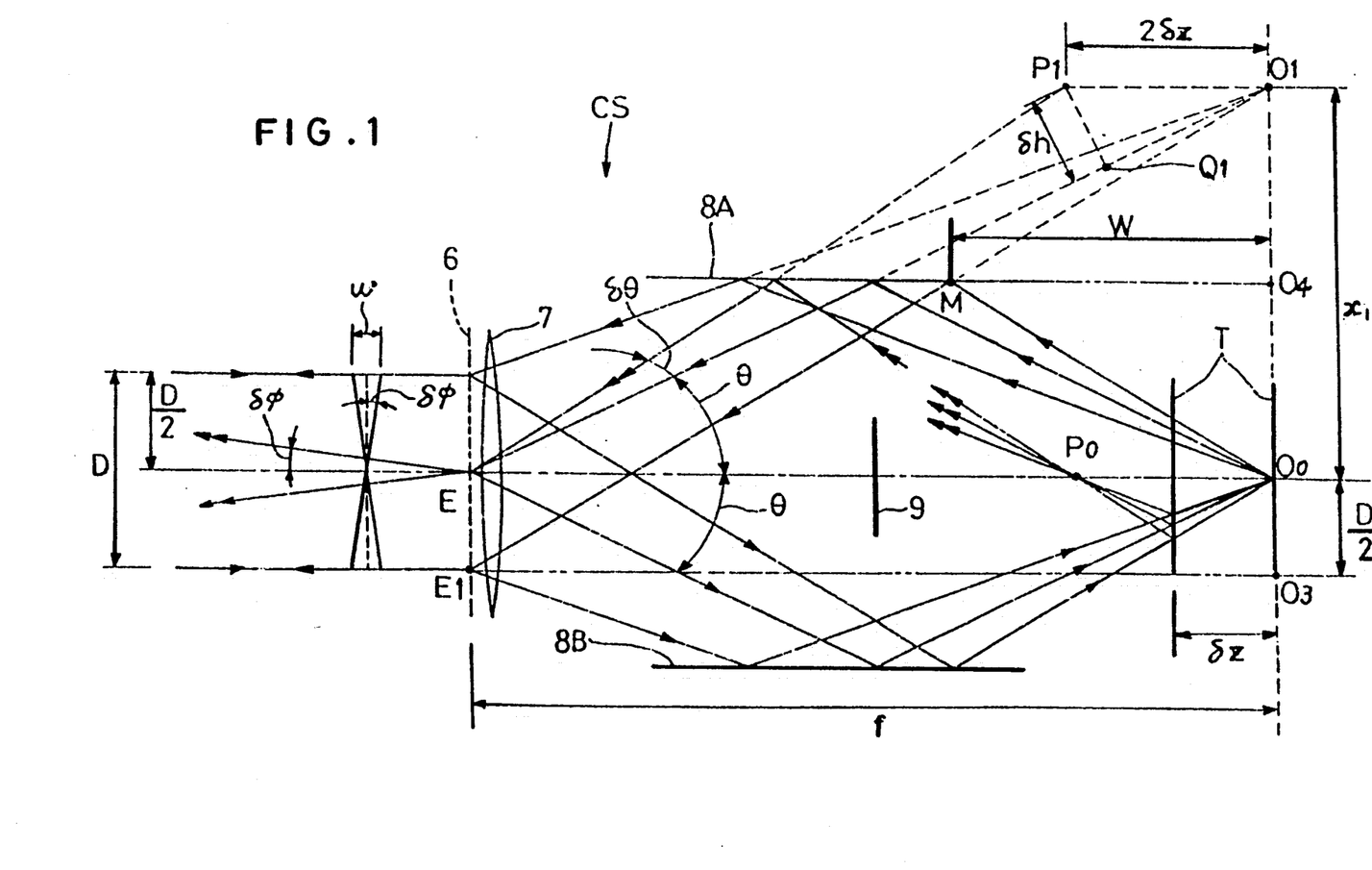
FIG. 1 is a diagram of an optical path illustrating a principle of measurement.

A principle of the object position measuring system related to the present invention will be described with reference to FIG. 1. FIG. 1 shows a simple construction in which the beam emitted from a light beam source (not shown) travelling from the left to the right in the same figure comprises parallel beams.

A reference numeral 6 denotes a diffraction grating, through which the beam emitted from the light beam source is diffracted. This diffracted beam actually includes a plurality of beam components. In this system, positive (pos.) 1st-order diffracted beam and negative (neg.) 1st-order diffracted beam are utilized. However, another pair of positive and negative diffracted beams such as pos. and neg. 2nd-order diffracted beam or pos. and neg. 3rd-order diffracted beam may also employed. Or, even a pair of positive and negative diffracted beams of other different orders may be employed as well. It is to be noted also that the straight-travelling 0-order diffracted beam is blocked by a beam-blocking plate 9.

The principle of the system will be described by way of example of the pos. and neg. 1st-order diffracted beams.

The pos. and neg. 1st-order beams from the diffraction grating 6 travel through a lens 7 displaced rearwardly of the diffraction grating 6 and are reflected by a pair of mirrors 8A and 8B displaced to be parallel with respect to an axis of the 0-order diffracted beam and converge to cross each other on a focal point 00 of the lens 7 are then projected onto an object T to be measured.

For simplifying the description, only the beam downwardly diffracted through the diffraction grating 6 (which will be referred to simply as the neg. 1st-order diffracted beam hereinafter) is shown. The un-shown upwardly diffracted beam (which will be referred to simply as the pos. 1st-order diffracted beam hereinafter) travels in an optical path symmetrical to that of the neg. 1st-order diffracted beam with respect to the 0-order diffracted beam.

When the measuring object T is positioned at the focal point 00 of the lens 7, the neg. 1st-order diffracted beam, after being reflected by the object T, travels in the opposite direction on the same optical path as the pos. 1st-order diffracted beam and is reflected by the upper mirror 8A, passes the lens 7 and is again diffracted through the diffraction grating 6 to return as a parallel beam.

On the other hand, in the same manner as the above neg. 1st-order diffracted beam, the pos. 1st-order diffracted beam travel in the opposite direction on the same optical path as the neg. 1st-order diffracted beam and is again diffracted through the diffraction grating 6 to return as a parallel beam. Therefore, in this case, interference fringes do not occur between the two returned diffracted beams having been reflected by the object T.

When the object T is displaced from the focal point 00 of the lens 7; for example, when the object is displaced from the focal point 00 towards the light beam source by $\delta z$ as shown in the same figure, the pair of diffracted beams do not cross each other on the object T and are reflected by the object T to cross each other at a point Po displaced by $2\delta z$ from the focal point 00 of the lens 7 towards the light beam source.

Since a point P1 is positioned symmetrically with respect to the upper mirror 8A an image of the point P0, the neg. 1st-order diffracted beam returns, as if the same were emitted from this point P1. Accordingly, the beam having been reflected by the upper mirror 8A to pass the lens 7 and are then diffracted through the diffraction grating 6 which downwardly displaces them by $\delta\phi$ relative to the original beam emitted from the light beam source.

On the other hand, the travelling direction of the pos. 1st-order diffracted beam having been reflected by the object T is upwardly displaced by $\delta\phi$ relative to the original beam emitted from the light beam source. Therefore, because of the sum $2\delta\phi$ of the displacement amounts of the travelling directions of the two diffracted beams, there occurs interference fringes. These interference fringes vary depending on the above-described sum of the displacement amounts of the two diffracted beams having been reflected by the object T. And, the distance between the travelling directions of the diffracted beams, e.g., a variation in the diffraction angle of the reflected and diffracted beams varies depending on a position of the object to be measured as will be described hereinafter.

Therefore, by measuring the number of the interference fringes or a distance between light portions or dark portions of the fringes, or by measuring an amount of movement of the optical unit or the object with moving the object so as not to cause the interference fringes, it is possible to measure the displacement amount $\delta z$ of the object T from its reference position, i.e. the focal point 00 of the lens 7.

The relationship between the displacement amount $\delta z$ of the object T and the distance of interference fringes will now be described with reference to FIG. 1.

First, since the displacement amount $\delta\phi$ of the object T is smaller than a focal length f of the lens 7, an optical path difference $\omega$ between the beams reflected by the object T and then again diffracted through the diffraction grating 6 is obtained as a difference in plane waves.

Also, based on the above assumption, if the base of a vertical line extending from the point P1 to a straight line connecting between the point E (which is a cross point between the diffusion grating 6 and the optical axis L of the lens 7) and the point 01 symmetrical to the focal point 00 of the lens 7 with respect to the mirror 8A is Q1, then:

$$\overline{EQ1} \approx f/\cos\theta \qquad (1)$$

where $\theta$: a diffraction angle of the pos. and neg. 1st-order diffracted beams The path difference $\omega$ is expressed by the following equation:

$$\omega = 2 \cdot (D/2) \cdot \tan \delta\phi \qquad (2)$$

where
a diameter of light beam emitted from a light beam source, and $\delta\phi$: a variation amount in the diffraction angle of the beams reflected by the object T and then again diffracted by the diffraction grating 6 attendant with a displacement of the object T If the above variation amount $\delta\phi$ of the diffraction angle is very small, then:

$$\tan \delta\phi \approx \delta\phi \qquad (3)$$

If the object T is moved by $\delta z$, the beam reflected by the object T is incident into the diffraction grating 6 at an angle of $\theta + \delta\theta$ and is diffracted therethough at an angle of $\delta\theta$.

Therefore, through differentiation by the following general expression of diffraction:

$$\sin \text{(incident angle)} - \sin \text{(diffraction angle)} = -n \cdot \lambda/d \qquad (4)$$

n: order of diffraction (an integer)
$\lambda$: wavelength of the employed beam
d: inter-grate distance of the diffraction grating
Then;

$$\delta\phi = \delta\phi \cdot \cos\theta \qquad (5)$$

Further, since the variation $\delta\theta$ in FIG. 1 is expressed by the following equation from the expression (1):

$$\tan \delta\theta = \frac{\delta h}{EQ_1} \qquad (6)$$

and since this incident angle variation amount $\delta\theta$ is very small; then, $$\tan \delta\theta \approx \delta\theta \qquad (7)$$

the displacement amount $\delta\theta$ may be obtained from the following equation:

$$\delta\theta = \delta h \cdot \cos \theta / f \qquad (8)$$

Also, as for $\Delta O1P1Q1$ in FIG. 1, since:

$$\overline{P1Q1} = \delta h = 2 \cdot \delta z \cdot \sin \theta \qquad (9)$$

and based on the condition (incident angle 0°, diffraction angle $\theta$) when the beam initially enters the diffraction grating 6, by using the following equation:

$$\sin \theta = n \cdot \lambda/d \qquad (10)$$

then:

$$\delta h = 2 \cdot \delta z \cdot \lambda/d \qquad (11)$$

In the above equation (10), it is assumed that the diffraction order n is the pos. 1st-order.

Therefore, by substituting the equations (5), (8) and (11) in the equation (2), the following relational expression (12) is obtained:

$$\omega = (2 \cdot \delta z/F) \cdot (\lambda/d) \cdot \cos^2\theta \qquad (12)$$

provided $F = f/D$. Based on the above relational expression (12), there is also obtained the following relational expression (13):

$$\tan \delta\phi = (2 \cdot dz/f) \cdot (\lambda/d) \cdot \cos^2\theta \qquad (13)$$

On the other hand, the distance a of the interference fringes (sum width of a light portion and a dark portion) caused due to a displacement of the object T from the focal point Oo of the lens 7 may be expressed by the following equation (14):

$$a = \lambda/2 \sin \delta\phi \qquad (14)$$

Since the variation amount $\delta\phi$ resulting from the displacement of the object T is very small, then;

$$\sin \delta\phi = \tan \delta\phi \qquad (15)$$

And, from the equations (13) and (14), the following relational expression (16) is obtained:

$$a = f \cdot d/4 \cdot \delta Z \cdot \cos^2\theta \qquad (16)$$

Therefore, if the focal length f of the lens 7, the intergrate distance d of the diffraction grating 6 and the diffraction angle $\theta$ of the parallel beam through the diffraction grating 6 are known in advance, it is possible to determine the displacement amount of the object T to be measured by measuring the width a of the interference fringes (width of both the light portion and the dark portion) or width a/2 (width of either of the light portion or the dark portion) and then by calculation using the above expressed relationship (16).

The distance of the interference fringes may also be measured by visually observing and counting a difference in the numbers of interference fringes within a predetermined area. However, for obtaining measurement result of a higher precision, it is convenient to use e.g. a CCD type line sensor for evaluating a variation in the outputs of this line sensor and to measure the distance based on this evaluation.

In the above description, the position of the object is determined by measuring the number or the width of the interference fringes. Instead of this, however, it is possible to utilize a more practical method wherein the measuring device or the object to be measured is adapted to be movable in the travelling direction of the 0-order diffracted beam. And, after the device or the object has been moved to a position where interference fringes do not yet occur, the object position is determined by measuring this movement amount.

In either case, in the object position measuring system related to the present invention, the object position is determined by diffracting a light beam emitted from a light beam source through a diffraction grating 6 into diffracted beam components, applying a pair of diffracted beam components onto the object T to cause the reflected beam components to interfere with each other and then by observing or evaluating the resultant interference fringes. Therefore, since by utilizing the interference the displacement amount of the object in the depth direction thereof (the direction of the 0-order diffracted beam) is observed as being converted into a displacement amount in a direction normal to the depth direction, it is possible to measure an object position with a high precision while maintaining a sufficiently wide operative distance without coming into contact with the object.

Figure 2:
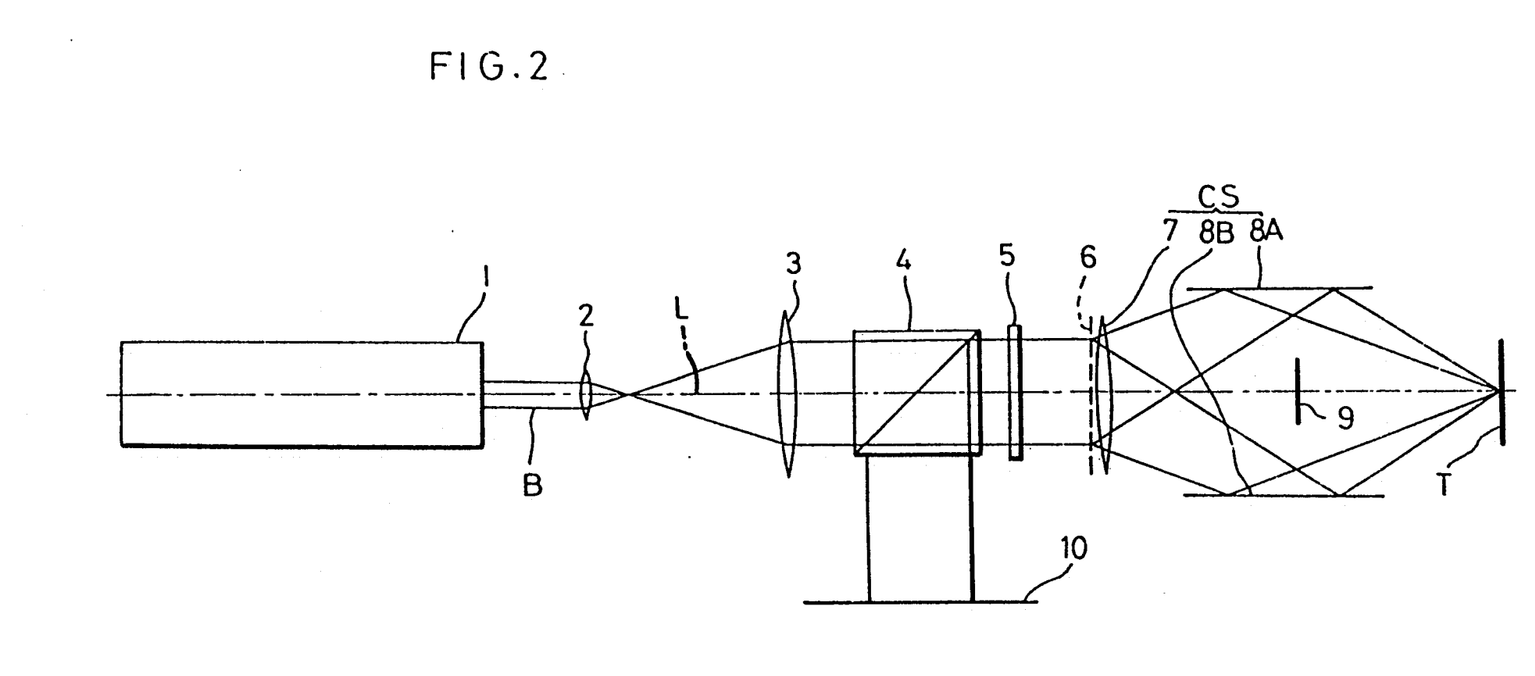
FIG. 2 is a schematic construction view of an object position measuring device.

FIG. 2 shows a schematic construction of an object position measuring device effectively embodying an object position measuring system related to the present invention.

Referring to the same figure, a reference numeral 1 denotes an He-Ne laser acting as a light beam source. A laser beam B emitted from this He-Ne laser is configured by a beam configuring lens and then is rendered to be a parallel beam through a collimating lens 3. Thereafter, the beam is transmitted through a polarizing beam splitter 4 and then becomes a circularly polarized beam a quater wavelength plate 5 to enter a diffraction grating 6.

Rearwardly of this diffraction grating 6, there are provided a lens 7 and a pair of mirrors 8A and 8B disposed symmetrically and in parallel with each other and with respect to an optical axis L. Diffracted beams from the diffraction grating 6, only positive and negative 1st-order diffracted beams, are reflected by the pair of mirrors 8A, 8B and converged by the lens 7 to cross each other at its focal point 00. That is to say, the lens 7 and the pair of mirrors 8A, 8B constitute a converging optical system CS.

The 0-order diffracted beam travelling straight through the diffraction grating 6 is blocked by a blocking plate 9 displaced in an optical path. It is to be noted that not only the above pos. and neg. 1st order diffracted beams, but also other pairs of diffracted beams such as a pair of positive and negative diffracted beams preferably of the same order, e.g. 2-order or 3-order, may be employed as well.

An object T to be measured is positioned at or adjacent the focal point 00 of the lens 7. The pair of diffracted beams are reflected by this object T and the reflected beams are transmitted through the pair of mirrors 8A, 8B, the lens 7, the diffraction grating 6 and the quarter wavelength plate 5 to again enter the polarizing beam splitter 4.

No light beam reflected by the object T returns to the He-Ne laser 1, but all of the beam is directed towards a screen 10 by the beam splitter 4.

The measuring principle of the object position measuring system related to the present invention has already been described hereinbefore and therefore will not be discussed in detail here again. As described hereinbefore, when the object T is positioned on the focal point 00 of the lens 7, no interference fringes are observed on the screen 10. On the other hand, if the object T is out of the focal point 00, interference fringes having different inter-distances, a, are observed on the screen 10 depending on a displacement amount δz of the object T from the focal point 00 of the lens 7 shown in FIG. 1.

Between this inter-distance of the interference fringes, i.e., a sum width of a light fringe portion and a dark fringe portion and the displacement amount δz of the object T, there is a relationship expressed by the following equation (16):

$$a = f \cdot d / 4 \cdot \delta z \cdot \cos^2 \theta \tag{16}$$

f: focal length of the lens 7
d: inter-grating distance of the diffraction grating 6

θ: diffraction angle of parallel beam by the diffraction grating 6

For example, if the focal length of the lens 7 is 100 mm, the inter-grating distance of the diffraction grating 6 is 2 μm and since the laser beam B from the He-Ne laser 1 has a wavelength of 0.6328 μm, therefore;

$$\sin \theta = 0.3164$$

the above equation (16) is now re-expressed as:

$$a = 200000 / 3.6 \cdot \delta z \tag{17}$$

Since the width a of the interference fringes is the sum of the widths of the light portion and the dark portion of the same, if only the width a/2 of the light portion is to be observed, then, the above equation (17) may be now re-expressed as:

$$a/2 = 100000 / 3.6 \cdot \delta z \tag{18}$$

If the object T is positioned on the focal point 00 of the lens 7 thereby causing no interferance fringes and then the object T is displaced therefrom along the optical axis L and if interference fringes having a light portion width of 10 mm are observed, then by substituting the following equation (19) into the equation (18):

$$a/2 = 100000 \, \mu m \tag{19}$$

the following equation (20) is obtained:

$$\delta z = 2.78 \, \mu m \tag{20}$$

That is to say, it is measured that the displacement amount of the object T is 2.78 μm.

It is also possible to measure the displacement amount of the object T without relating the same to the focal point 00 of the lens 7 as the reference. For example, if the object T is further displaced along the optical axis L from its above-described position where the interference fringes having the light portion width of 10 mm and then if interference fringes having a light portion width of 11 mm are observed at this position, then by substituting the following equation (21) into the equation (18):

$$a/2 = 11000 \, \mu m \tag{21}$$

and the following equation (22) is obtained:

$$\delta z = 2.45 \, \mu m \tag{22}$$

Then, based on the difference between the equation (20) and the equation (22), it is measured that the displacement amount of the object T is 0.33 μm in this case.

If an additional arrangement is provided such that the dark portion or light portion width of the interference fringes may be electricaly measured by an output from e.g. a CCD type line sensor, it becomes possible to enhance the precision of the displacement amount of the object T. In this case, by providing the CCD type line sensor in place of the screen 9 and by processing the output signal from this line sensor, a width a/2 of the interference fringes may be obtained.

An operative distance (range) of the object T by the object position measuring system of the present invention now be described. Referring back to FIG. 1, the range in which all of the pos. and neg. 1st-order diffracted beams are reflected by the object T may be considered as the operative distance W.

In FIG. 1:

$$\overline{00\overline{1}} = x1 = f \cdot \tan \theta \quad (23)$$

This distance is also the distance between the pair of mirrors 8A and 8B.

Further, considering two similar triangles 01E103 and 01M104, there is a relationship therebetween expressed by the following equation (24):

$$(x1 + D/2)/f = (x1/2)/W \quad (24)$$

then, by substituting the above equation (24) into the equation (23), the following relationship (25) may be obtained:

$$W = f^2 \cdot \tan \theta / 2 \cdot (D/2 + f \cdot \tan \theta) \quad (25)$$

In the same manner as in the previous case, if the focal length of the lens 7 is 100 mm, the intergrating distance of the diffraction grating 6 is 2 $\mu$m, and the F number of the lens 7 is 4 and the laser beam B from the He-Ne laser 1 has the wavelength of 0.6328 $\mu$m. By substituting these values into equation (25):

$$W = 36.4 \text{ mm} \quad (26)$$

This value is much superior to the operative distance obtained by the microscope method.

Figure 3:
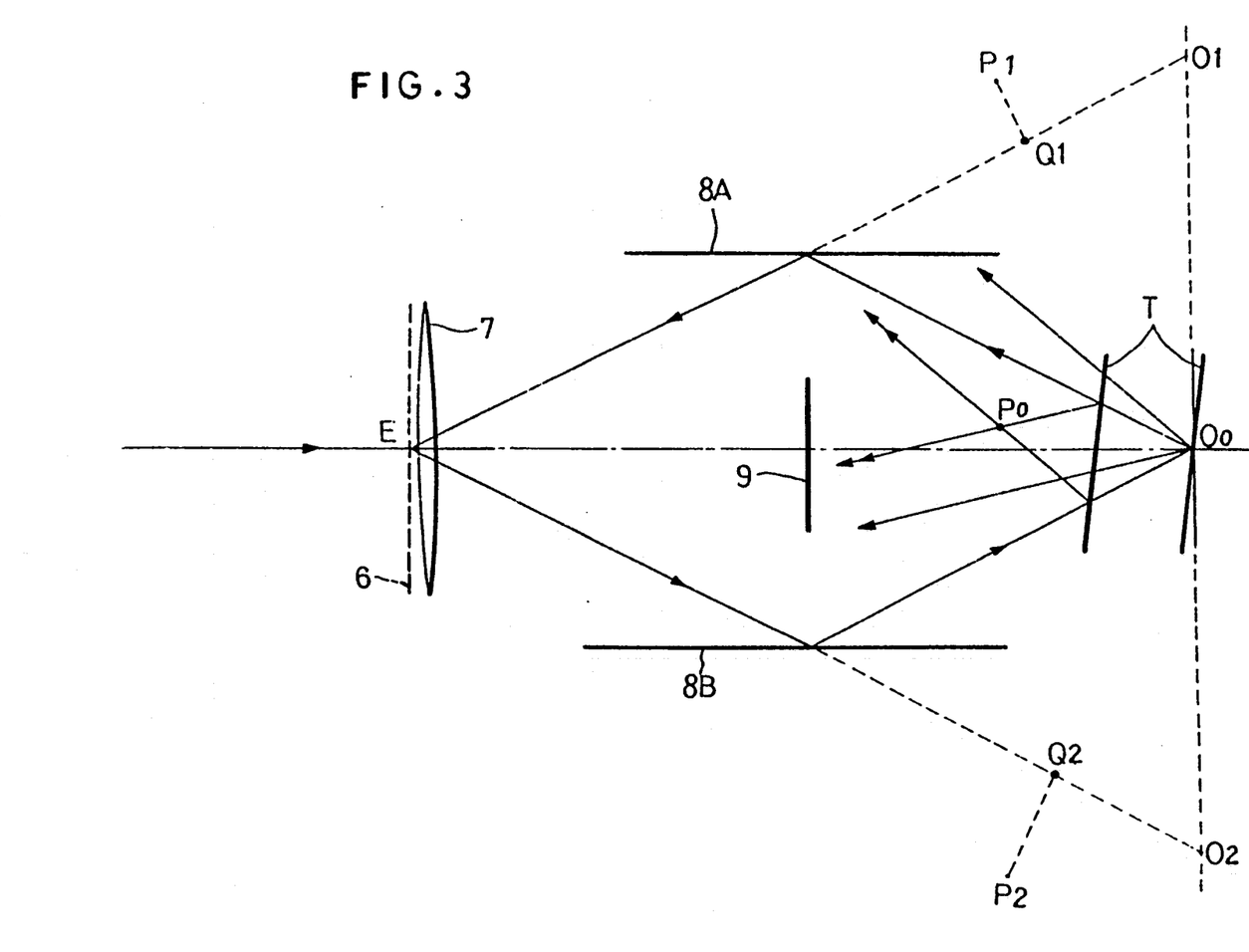
FIG. 3 is a diagram showing an optical path in which an object to be measured is inclined.

On the other hand, there is a case in which the object T is not normal to the optical axis L of the above-described measuring optical system when the object T is not even or depending on a position of the object T. This case is illustrated in FIG. 3. In FIG. 3, only the central beam of the diffracted beams is shown.

As may be seen from this FIG. 3, if the object T is positioned at a crossing point of the pos. and neg. 1st-order diffracted beams diffracted by the diffraction grating 6, the diffracted beams reflected by the object T travel as if the same were emitted from points 01 and 02 symmetric to the focal point 00 of the lens 7 with respect to the pair of mirrors 8A and 8B. And, in the same way as the previous case, after the beams are transmitted through the lens 7 and are diffracted by the diffraction grating 6, no inteference fringes are observed.

On the other hand, if the object T is moved from the above point toward the direction of the optical axis L, the beams reflected by the object T travel as if the same were emitted from points P1 and P2 symmetric to the crossing point P0 of the beams with respect to the mirrors 8A and 8B. Since these beams are displaced in their travelling directions relative to the beams from the points 01 and 02, interference fringes are also observed in this case between the beams transmitted again through the lens 7 and diffracted by the diffraction grating 6.

In the above description, the converging optical system CS is so constructed that the pair of positive and negative diffracted beams diffracted by the diffraction grating 6 are focused on the optical axis L. Instead of this, the displacement amount or the like of the object T may be measured by an alternately constructed converging system in which the pair of diffracted beams cross each other at a point different from the focal point. This case will be described next with reference to FIG. 4.

Figure 4:
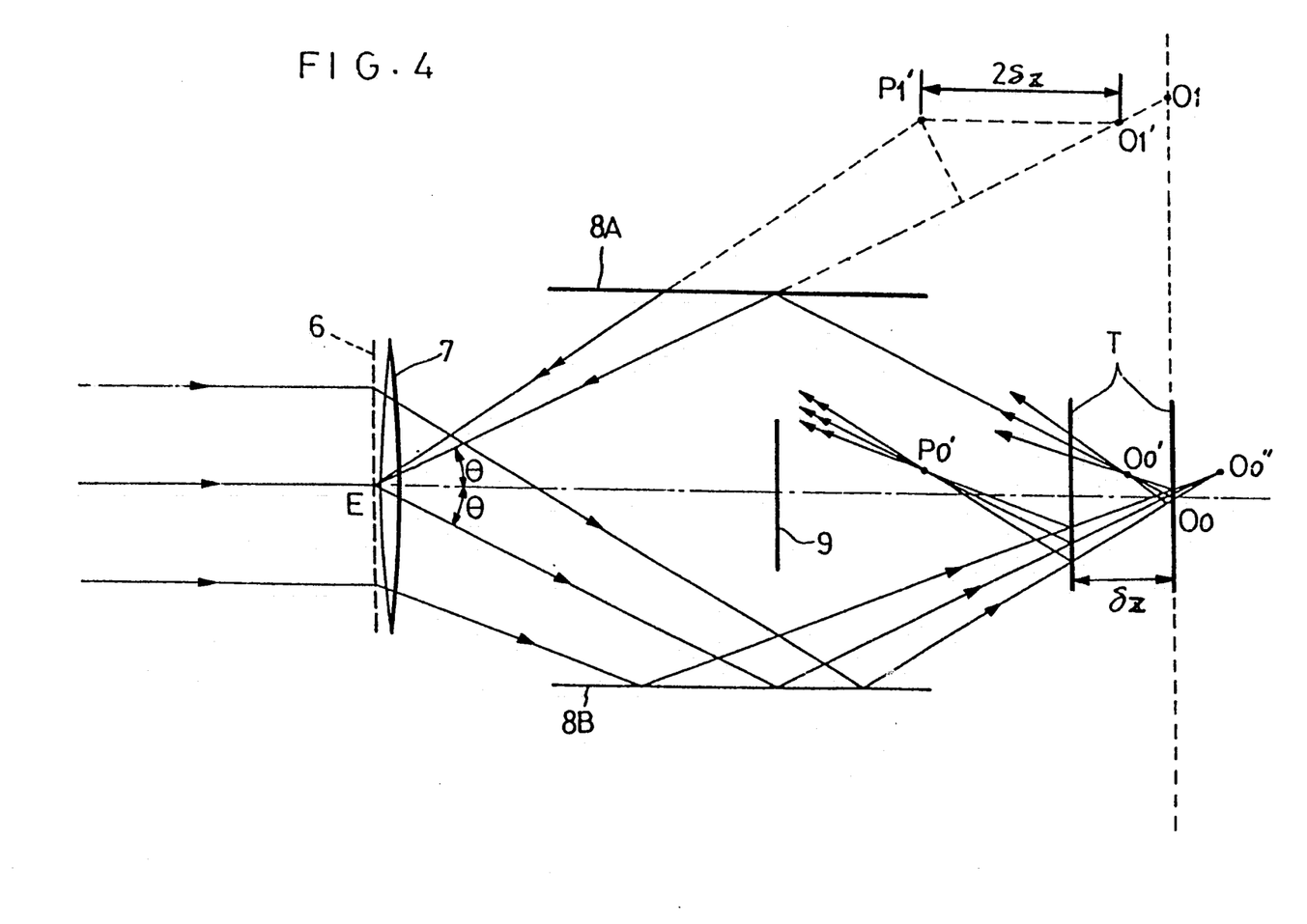
FIG. 4 is a diagram of an optical path in which diffracted beams do not converge on an optical axis.

In this FIG. 4 also, only the neg. 1st-order diffracted beam is shown. This neg. 1st-order diffracted beam forms a focal point 00" at a position off the optical axis L. In this case, if the object T is positioned at a point 00 where a center line of the pair of diffracted beams crosses the optical axis L, no interference fringes occur.

More particularly, the neg. 1st-order diffracted beam is reflected by the object T and forms a point image at a point 00' symmetric to the focal point 00/" with respect to the object T. This neg. 1st-order diffracted beam is reflected by the upper mirror 8A and travels as if the same were emitted from a point 01' symmetric to the point 00' with respect to this mirror 8A and transmits through the lens 7, and then the beam is diffracted by the diffraction grating 6.

Also, the point 01 symmetric to the point 00 where the object T is positioned with respect to the mirror 8A is on a straight line connecting between a point E where the diffraction grating 6 crosses the optical axis L and the point 01'. Therefore, the pair of diffracted beams reflected by the object T have no displacement in their travelling directions relative to the original diffracted beams and no interference fringes occur.

On the other hand, if the object T is displaced from the above point 00 in the direction of the optical axis L, the neg. 1st-order diffracted beam forms a point image at a point P0'. Since a point P1' symmetric to the point P0' with respect to the mirror 8A moves from the point 01' in the direction of the optical axis L by a distance 2 $\delta z$ which is twice as large as the displacement amount $\delta z$ of the object 'T', the neg. 1st-order diffracted beam is reflected firstly by the object T and secondly by the mirror 8A and then the beam travels as if the same were reflected from this point P1'. This neg. 1st-order diffracted beam transmits through the lens 7 and is diffracted by the diffraction grating 6 and then travels in a direction displaced from that of the original beam emitted from the light beam source.

Though not shown, the pos. 1st-order diffracted beam also travels in a direction displaced from that of the original beam emitted from the light beam source after being reflected by the object T and diffracted again by the diffraction grating 6. Therefore, by causing these pair of pos. and neg. diffracted beams to interfere with each other, interference fringes are observed. And, by measuring the width or the like of these interference fringes, it is possible to measure the displacement amount of the object T.

In the above-described constructions, the pair of mirrors 8A and 8B are disposed symmetrically and are parallel with each other across the optical axis L. Instead of this; however, the pair of mirrors 8A and 8B need not always be disposed in parallel with each other. For example, in a case (I) shown in FIG. 5, the mirrors 8A and 8B may also be displaced to form an angle 'α' from the optical axis L to each come closer towards the object 'T', or in case (II) shown in FIG. 6, the mirrors 8A and 8B may be displaced to form an angle 'β' from the optical axis L to depart from each other towards object T.

Figure 5:
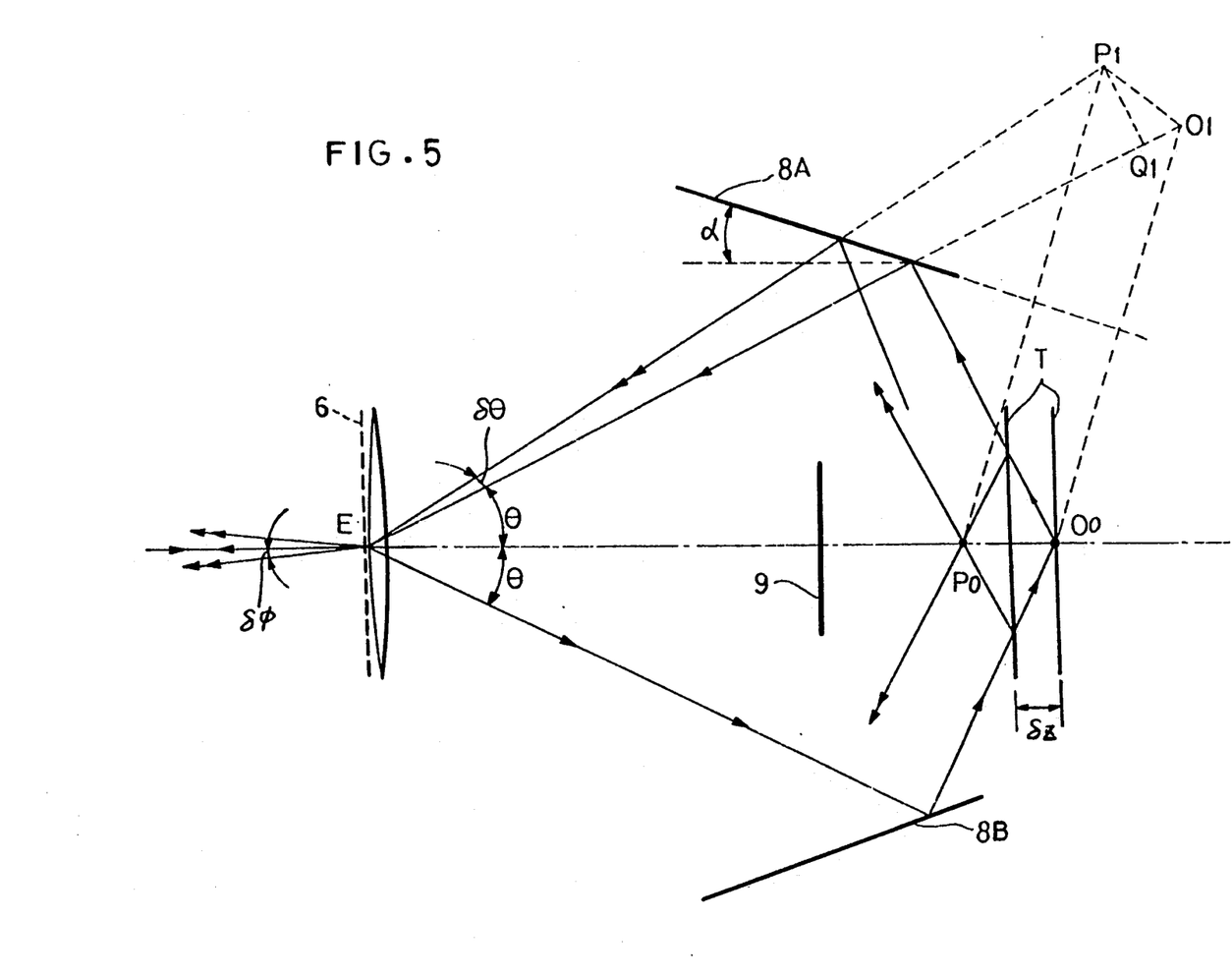
FIGS. 5 and 6 are diagrams of an optical path in which a pair of mirrors are not disposed in parallel with each other.
Figure 6:
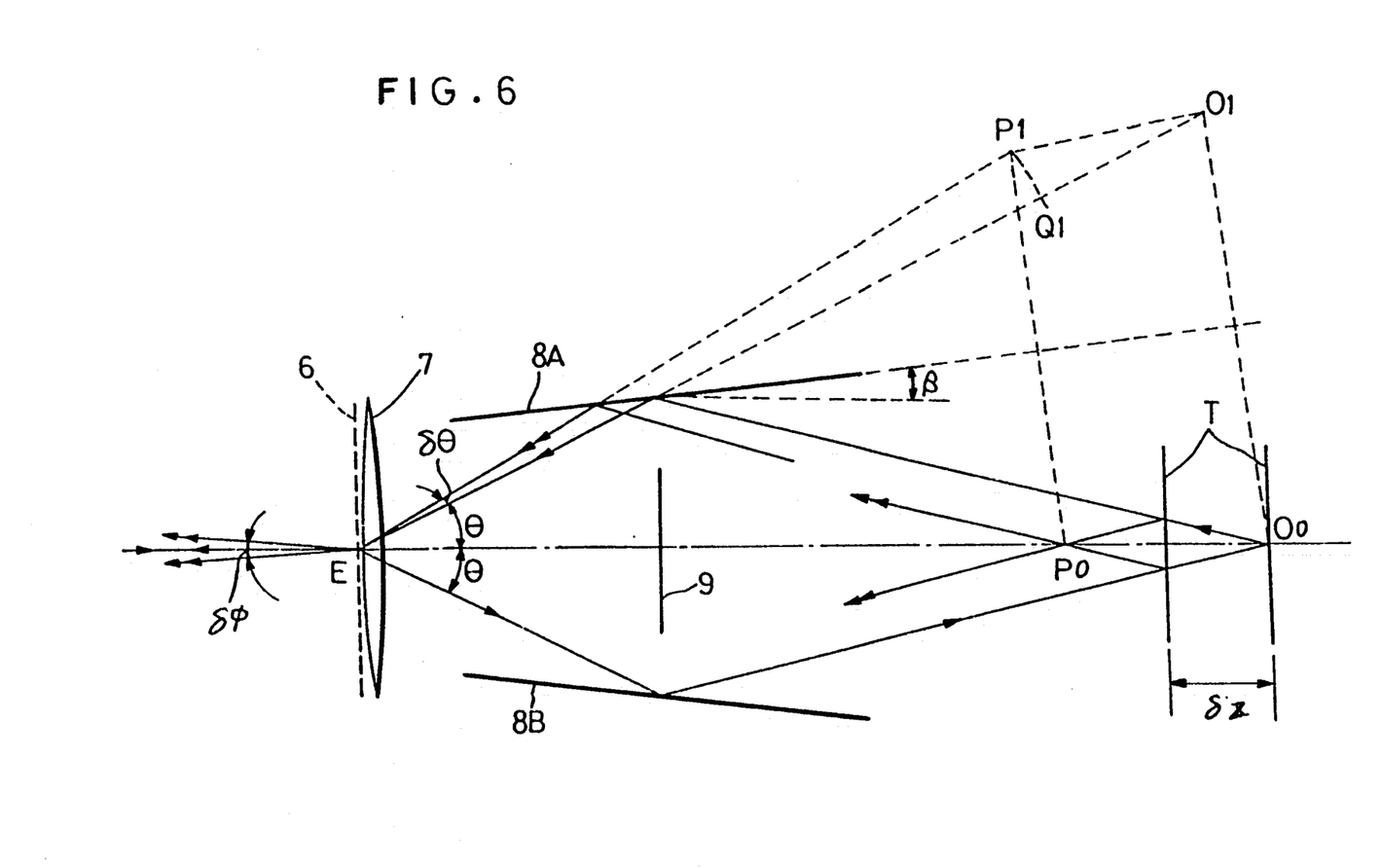

In any of the above constructions, the principle of the measurement is substantially the same. However, there are small differences in the measurement precision and the operative distance.

That is to say, in the construction illustrated in FIG. 1, the relationship expressed by the equation (9):

$$\overline{P1 \ Q1} = \delta h = 2 \cdot \delta Z \cdot \sin \theta$$

varies depending on the inclinations of the pair of mirrors 8A and 8B. That is:

In case (I), there is a relationship expressed by the following equation (27):

$$\overline{P1\ Q1} = \delta h = 2 \cdot \delta Z \cdot \sin(\theta + 2\alpha) \tag{27}$$

Therefore, compared with the construction of FIG. 1, the measurement precision is higher, but the operative distance is shorter.

In the case (II), there is a relationship expressed by following equation (28):

$$\overline{P1Q1} = \delta h = 2 \cdot \delta Z \cdot \sin(\theta - 2\beta) \tag{28}$$

Therefore, compared with the construction of FIG. 1, the measurement precision is slightly less, but the operative distance is longer.

Further, in the above-described constructions, from the light beam source He-Ne laser 1 towards the object T, the diffraction grating 6, the lens 7, the pair of mirrors 8A and 8B are disposed in order. This disposing order may be conveniently varied.

Figure 7:
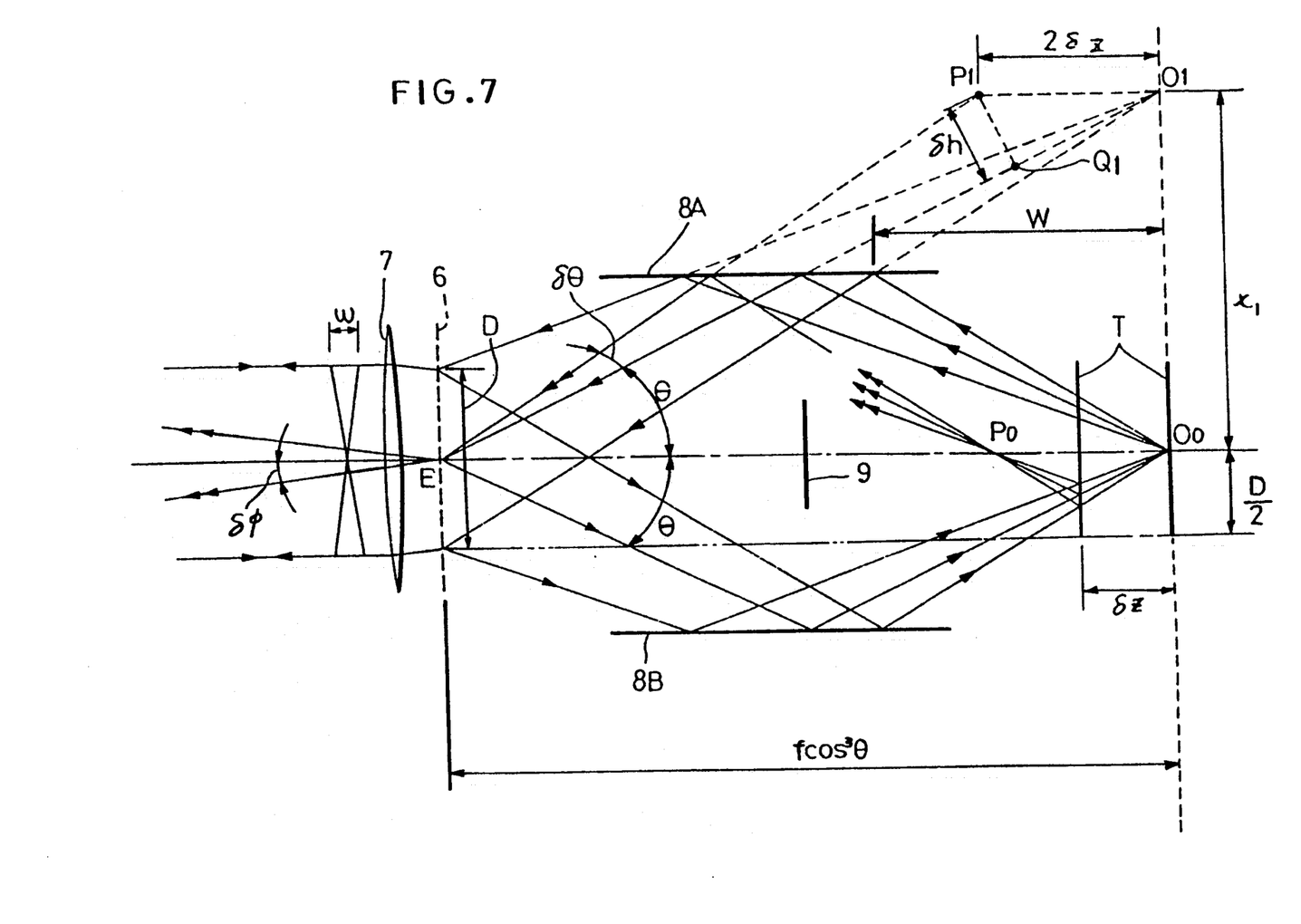
FIG. 7 is a diagram of an optical path in which a diffracting grating is displaced from a lens towards the object to be measured.

For example, in a construction shown in FIG. 7, the diffraction grating 6 is disposed further towards the object T than the lens 7. In this case also, although the measurement principle is basically the same as that of the construction of FIG. 1, there are slight differences in the measurement precision and in the operative distance as will be described next.

As is known, by providing the diffraction grating 6 in the optical path of the light beam to be converged by the lens 7, a distance $\overline{E01}$ between the point E where the diffraction grating 6 crosses the optical axis L and a point 01 which is a point symmetric to the point 00, where the beams diffracted by the diffraction grating 6 are converged with respect to the mirror 8A″ is expressed by the following equation (29):

$$\overline{E01} = f \cdot \cos^2 \theta \tag{29}$$

Therefore, by applying the assumption used in the description of the construction of FIG. 1 that the displacement amount δz of the object T is smaller than the focal length f of the lens 7, then:

$$\overline{EQ1} \approx \overline{EQ1}$$

And, in place of the equation (8) obtained in the constuction of FIG. 1, the following equation (30) is derived:

$$\delta\theta = \delta h / f \cdot \cos^2 \theta \tag{30}$$

Accordingly, the following equation (31) is derived in place of the equation (12);

$$\omega = (2 \cdot \delta z / F) \cdot (\lambda \cdot d) \cdot (1/\cos \theta) \tag{31}$$

If $\omega = \lambda/4$, i.e. the displacement amount δz of the object T when 50% light intensity variation occurs is considered as a reference on the following conditions:

λ = 0.6328 μm d = 2 μm

F = 4 then, in the construction of FIG. 1, the displacement amount δz of the object T, from the equation (12), is now expressed by the following equation (32):

$$\delta z = 1.1\ \mu m \tag{32}$$

On the other hand, in the case of the construction of FIG. 7, the displacement amount δz of the object T, based on the equation (31) is now expressed by the following equation (33):

$$\delta z = 0.95\ \mu m \tag{33}$$

Comparing the equation (33) with the equation (32), it may be seen that the sensitivity is higher in this construction of FIG. 7 than in the construction of FIG. 1.

Further, in the case of the lens 7 of the construction shown in FIG. 1, an angle of view wide enough to permit the transmission of the pair of diffracted beams diffracted with an angle of θ through the diffraction grating 6 is necessary, and therefore, the lens 7 also need have a large outer radius.

On the other hand, in the case of the lens 7 in the construction shown in FIG. 7, since the beam emitted from the light beam source is diffracted by the diffraction grating 6 after transmitting through the lens 7, it is possible for the lens 7 even of the same F number to have a smaller outer radius and conversibly it is possible for the lens 7 having the same outer radius to have a smaller F number. Therefore, in the case of the construction of FIG. 7, by employing a lens of a smaller F number, it is possible to improve the sensitivity.

Figure 8:
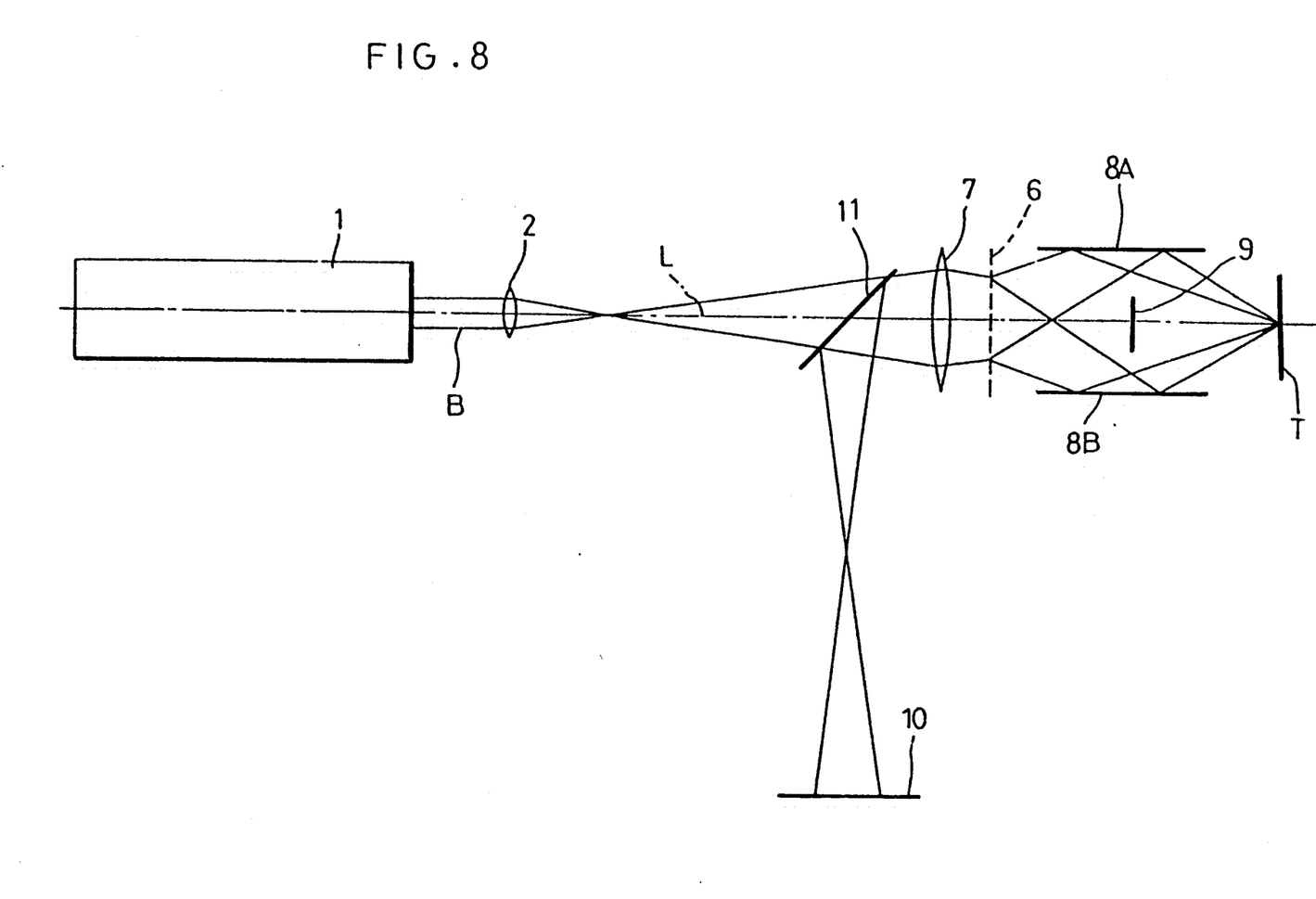
FIG. 8 is a schematic construction diagram corresponding to FIG. 2 and showing an alternate embodiment of the object position measuring device.

Moreover, in the case of the construction of FIG. 7, the collimating lens 3 is not necessary, and as shown in FIG. 8, by providing a half-mirror in place of the polarizing beam splitter 4, the construction of the overall optical system of the object position measuring device may be simplified.

As for the operative distance W, in FIG. 7, since:

$$\overline{0001} = x1 = \overline{E01} \cdot \sin \theta = f \cdot \cos^2 \theta \cdot \sin \theta \tag{34}$$

$$\overline{E00} = \overline{E01} \cdot \cos \theta = f \cdot \cos^9 \theta \tag{35}$$

then, in place of the equation (25) obtaind in the construction of FIG. 1, the following relational equation (36) may be obtained:

$$W = f^2 \cdot \cos^5 \theta \cdot \sin \theta / 2 \cdot (D/2 + f \cdot \cos^2 \theta \cdot \sin \theta) \tag{36}$$

In the above equation (36), it is to be noted, a reference mark D denotes a raidus of light beam entering the diffraction grating 6. Since the distance between the diffraction grating 6 and the lens 7 is very small, the radius D may be derived by approximation from the following relational equation:

$$F = f/D$$

By substituting the same values as in the previous case into the equation (36), then:

$$\dot{W} = 29.7\ mm \tag{37}$$

Considering the above equation (37) in connection with the equation (26), compared with the construction of FIG. 1, the operative distance is slightly smaller but substantially the same in this construction of FIG. 7.

Figure 9:
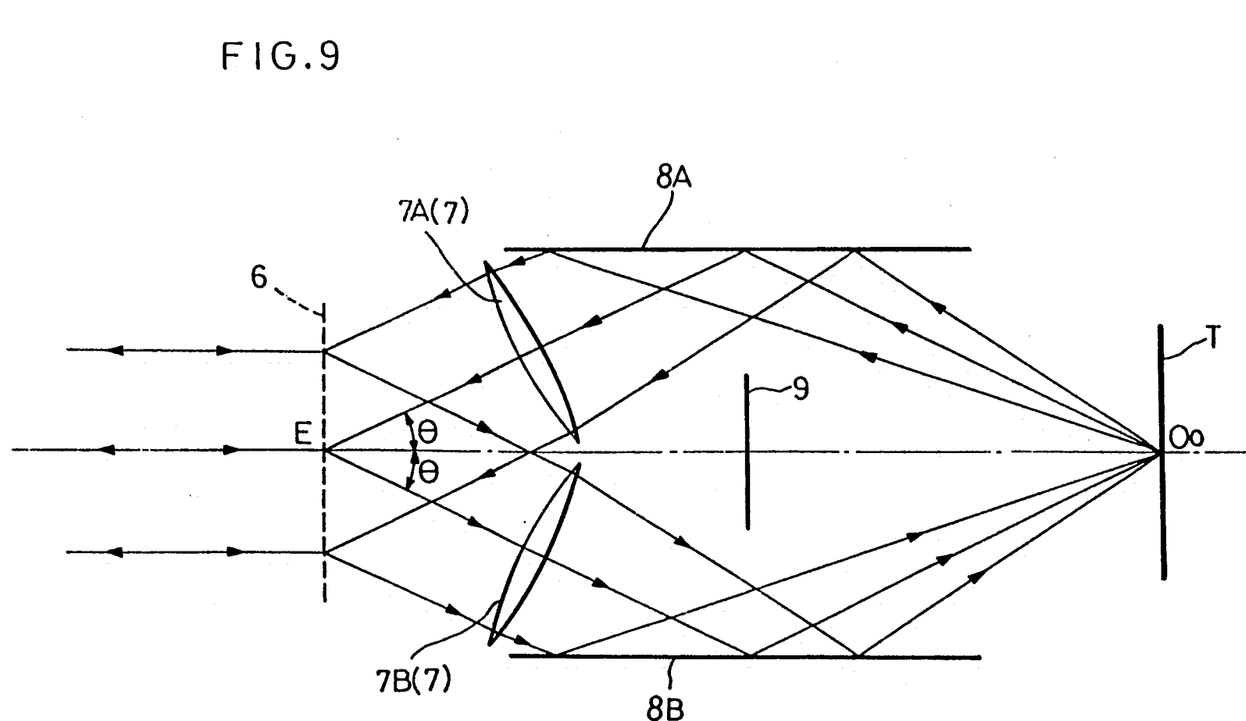
FIGS. 9 and 10 are diagrams of an optical path in which two lenses are separately provided.

In a construction shown in FIG. 9, the lens 7 in the construction of FIG. 1 is now constituted by a pair of lenses 7A and 7B disposed symmetrically to each other and at the same time normal to the travelling direction of the pos. and neg. 1st-order diffracted beams diffracted by the diffraction grating 6.

The principle of measurement is the same as in the previous constructions. However, this construction of FIG. 9 has the following advantages. That is to say, the outer radius of the lens 7 of the construction of FIG. 1 may be reduced by a reduction ratio of cos $\theta$, and the angle of view may be smaller since the lenses are disposed normal to the travelling direction of the pair of diffracted beams. As a result, it becomes possible to reduce the cost of the device.

Figure 10:
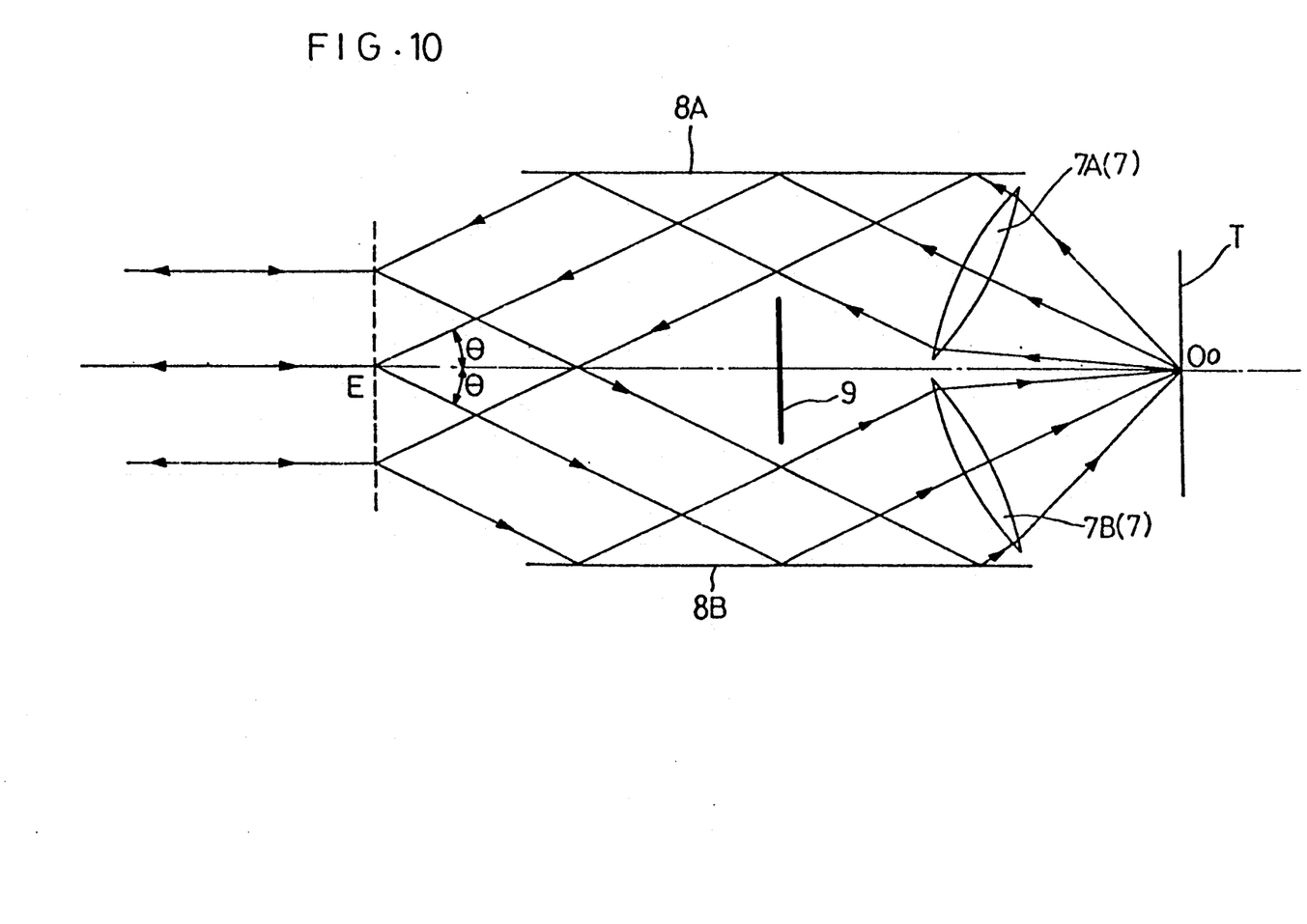

Further, in a construction shown in FIG. 10, the pair of lenses 7A and 7B symmetric with respect to the optical axis L are positioned towards the measuring object T side than the mirrors 8A and 8B and at the same time the lenses 7A and 7B are positioned normal to the travelling direction of the pair of diffracted beams after having been reflected by the mirrors 8A and 8B.

In this construction as well, the measurement principle is the same. However, as in the case of the construction shown in FIG. 9, this construction has the cost advantage since the outer radius of the respective lenses 7A and 7B may be reduced and also the angle of view may be smaller.

In all of the above-described constructions, the diffraction grating 6 for diffracting beam light emitted from the beam light source and the converging optical system CS including the lens 7 for converging and projecting the pair of diffracted beams from the diffraction grating 6 onto the object T act also for causing the pair of diffracted beams reflected by and returning from the object T to interfere with each other. Instead of this, although not shown, it is also possible to provide, independently or both the diffraction grating 6 and the converging optical system CS, another converging optical system and diffraction grating for causing the interference between the pair of diffracted beams reflected from the object T.

In the foregoing description of the measurment of displacement amount of an object by the object position measuring system related to the present invention, the measurement is carried out by moving the object T in the direction of the optical axis L.

Instead of this; however, the measurement may also be carried out by moving the object position measuring device per se in the direction of the optical axis L.

Further, it is also possible to carry out the measurement by moving either of the object T or the device in a direction normal to the optical axis L.

The object position measuring system of the present invention is basically designed for measuring displacements or surface conditions, or the like, of an object. However, the system will also find applications for measuring a thickness of a transparent object such as a glass plate, lens transparent layer of aluminum oxide.

That is, the object position measuring device is moved in the direction of the optical axis L so as not to cause interference fringes by using reflected beam from an upper face of the transparent object. Additionally, the object position measuring device is moved in the direction of the optical axis L so as not to cause intefer-ence fringes by using reflected beam from a lower face of the transparent object. In this case, since the interference fringes due to the reflected beam from a side different from that being measured have a high density, there will occur no significant inconveniences in the measuring operation.

A difference between the upper and lower faces thus measured is an optical thickness to, and if the refracting ratio is n, then, there is a relationship between the thickness to and a geometric thickness tg expressed by the following equation (38):

$$t0 = (2 - 1/n) \cdot tg \tag{38}$$

Therefore, if the refracting ratio n is known, it is possible to derive the geometric thickness tg from the optical thickness to; whereas, if the geometric thickness tg is known, it is possible to derive the refracting ratio n from the measured optical thickness to.

Further, it is to be noted that, in the foregoing constructions, the object position measuring system of the present invention employs the laser beam B emitted from the He-Ne laser 1 as the light beam to be measured. It is also possible to employ other kinds of laser beams. In addition, since the system utilizes the interference between beams having travelled for the same optical path length, it is also possible to utilize monochromatic light or white light.

I claim:

1. An object position measuring method comprising the steps of:

generating parallel beams of light;

diffracting the light beams to produce a pair of positive and negative diffracted beams;

focusing the positive and negative beams onto a pair of symmetrically disposed mirrors so that the positive and negative beams will reflect off of opposite mirrors and be incident onto the object;

reflecting the positive and negative beams off of the object so that the positive beam is reflected towards the mirror which reflected the incident negative beam, and the negative beam is reflected towards the mirror that reflected the incident positive beams;

focusing the positive and negative beams that have been reflected back from the object and off of the symmetrically disposed mirrors;

re-diffracting each of the diffracted beams reflected by the object to interfere with each other thereby to provide interference fringes if the object is not positioned at a predetermined point when each of the diffracted beams is concentrated on the object; and evaluating the interference fringes to determine the position of the object.

2. An object position measuring method, as defined in claim 1, wherein the evaluating step includes the step of moving the object relatively to the diffracted beams and a step of evaluating the inteference fringes before and after the moving step.

3. An object position measuring method comprising the steps of:

diffracting light beams emitted from a source with a diffraction grating means, said diffraction grating means producing a pair of positive and negative beams;

focusing the diffracted positive and negative beams onto the object by optical means so that the incident positive beam will reflect off the object in essentially a direction opposite that of the incident negative beam and the incident negative beam will reflect off of the object in essentially a direction opposite that of the incident positive beam;

focusing the positive and negative beams reflected by the object to said diffraction grating means;

diffracting each of said beams entering said diffraction grating means and causing the diffracted beams to interfere with each other, thereby providing interference fringes; and evaluating the interference fringes to determine a position of the object.

4. An object position measuring method, as defined in claim 3, wherein said diffracting step includes a step of transforming the beam emitted from the source into parallel beam components.

5. An object position measuring method, as defined in claim 3, wherein said optical means includes optical units disposed symmetrically with respect to a center line of a 0-order diffracted beam component diffracted by said diffraction grating means.

6. An object position measuring method, as defined in claim 3, wherein said source is a laser beam source.

7. An object position measuring method, as defined in claim 5, wherein said optical means includes lens means and each of said optical units includes a mirror.

8. An object position measuring method, as defined in claim 7, wherein said lens means comprises a lens for converging the pair of positive and negative diffracted beams diffracted by said diffraction grating means onto said object and for converging the diffracted beams reflected by the object onto said diffraction grating means and said diffraction grating means comprises a diffraction grating for diffracting the beam emitted from said source and for diffracting the reflected diffracted beams.

9. An object position measuring method, as defined in claim 7, wherein said lens means includes lenses respectively corresponding to said optical units.

10. An object position measuring method, as defined in claim 7, wherein said diffraction grating means, said lens means and said mirror are displaced in the order of the diffraction grating means, the lens means and the mirror from said source.

11. An object position measuring method, as defined in claim 7, wherein said diffraction grating means, said lens means and said mirror are displaced in the order of the diffraction grating means, the mirror and the lens means from said source.

12. An object position measuring method comprising the following steps of:

focusing by lens means a beam emitted from a source onto an object to be measured;

diffracting by diffraction grating means the beam transmitted through said lens means to produce a pair of positive and negative beams;

orienting by optical means each of said beams towards the object so that the incident positive beam will be reflected by the object in a direction opposite that of the incident negative beam, and the incident negative beam will be reflected by the object in a direction opposite that of the incident positive beam, both reflected beams being oriented by said optical means towards said diffraction grating means;

diffracting each of said beams again by said diffraction grating means to interfere with each other, thereby creating interference fringes; and evaluating the interference fringes to determine a position of the object.

13. An object position measuring method, as defined in claim 12, wherein said diffraction grating means includes a diffraction grating and said optical means includes mirrors disposed symmetrically with respect to a center line of a 0-order diffracted beam component diffracted by said diffraction grating means.

14. An object position measuring method, as defined in claim 12, wherein said source comprises a laser beam source.

15. An object position measuring device comprising:

a light beam source for emitting a light beam;

a diffraction grating for diffracting the light beam emitted from said light beam source;

a pair of beam components emitted from said diffraction grating consisting of a positive beam and a negative beam;

focusing optical means for orienting and converging said positive and negative beam components so that a reflected positive beam will reflect off the object in a direction opposite to a incident negative beam and a reflected negative beam will reflect off the object in a direction opposite a incident positive beam, both said reflected beams then being oriented and converged onto said diffraction grating, interference fringe evaluating means for evaluating interference fringes of the reflected diffracted beam components diffracted by said diffraction grating.

16. An object position measuring device, as defined in claim 15, wherein said beam source includes a laser beam source, a beam configuring lens for configuring excited laser beam and a collimating lens for collimating the diffracted beam components into a parallel beam.

17. An object position measuring device, as defined in claim 15, wherein said focusing optical means includes optical units disposed symmetrically with respect to a center line of a 0-order diffracted beam component diffracted by said diffraction grating.

18. An object position measuring device, as defined in claim 17, wherein said focusing optical means further includes lens means and each of said optical units comprises a mirror.

19. An object position measuring device, as defined in claim 18, wherein said lens means comprises a lens for converging said positive and negative beam components of the beam diffracted by said diffraction grating onto the object and for converging the diffracted beam components reflected by the object onto said diffraction grating and said diffraction grating includes a diffraction grating for firstly diffracting the beam emitted from said source and for diffracting the reflected diffracted beam components.

20. An object position measuring device, as defined in claim 18, wherein said lens means includes lenses respectively cooperating with said respective optical units.

21. An object position measuring device, as defined in claim 18, wherein said diffraction grating said lens means and said mirror are disposed in the order of the diffraction grating, the lens means and the mirror from said source.

22. An object position measuring device, as defined in claim 18, wherein said diffraction grating said lens means and said mirror are disposed in the order of the diffraction grating, the mirror and the lens means from said source.

23. An object position measuring device, as defined in claim 15, wherein said evaluating means includes a screen for displaying the interference fringes.

24. An object position measuring device, as defined in claim 17, wherein said evaluating means includes a sensor array for detecting the interference fringes and the output of the sensor array is used to obtain the position of the object.

25. An object position measuring device, comprising:
light beam source means that emits a light beam;
lens means for converging the beam emitted from said source means onto an object to be measured
a diffraction grating for diffracting the light beam transmitted through said lens means;
a positive and a negative beam component emitted from said diffraction grating;
optical means for orienting said pair of positive and negative beam components such that the incident positive beam is reflected off the object in a direction opposite that of the incident negative beam, and the incident negative beam is reflected off the object in a direction opposite the incident positive beam, both beam components being reflected by the object onto said diffraction grating via said optical means; and
interference fringe evaluating means for evaluating interference fringes of the reflected diffracted beam components diffracted by said diffraction grating and converged by said lens means.

26. An object position measuring device, as defined in claim 25, wherein said lens means comprises a lens for converging a pair of positive and negative diffracted beam components of the beam diffracted by said diffraction grating onto the object and for converging the diffracted beam components reflected by the object onto said diffraction grating and said diffraction grating includes a diffraction grating for firstly diffracting the beam emitted from said source and for diffracting the reflected diffracted beam components.

* * * * *